United States Patent [19]
Heinz et al.

[11] Patent Number: 5,630,292
[45] Date of Patent: May 20, 1997

[54] SUPPORT APPARATUS

[76] Inventors: David D. Heinz, 2885 W. El Paso St., Fresno, Calif. 93727; Frank A. Logoluso, 28281 Avenue 7 M, Madera, Calif. 93637

[21] Appl. No.: 549,247

[22] Filed: Oct. 27, 1995

[51] Int. Cl.[6] .......................... A01G 17/06; A01G 17/14
[52] U.S. Cl. .......................................................... 47/46
[58] Field of Search ........................ 47/46 R, 44 R, 47/47 R, 45 R; 248/156

[56] References Cited

U.S. PATENT DOCUMENTS

| | | | |
|---|---|---|---|
| D. 280,794 | 10/1985 | Evans | 47/46 R |
| 3,419,998 | 1/1969 | Burton . | |
| 3,791,070 | 2/1974 | Roberts | 47/46 R |
| 4,023,307 | 5/1977 | Clark et al. | 47/46 R |
| 4,536,989 | 8/1985 | Caywood et al. | 47/46 R |
| 4,625,454 | 12/1986 | Daniell | 47/46 R |
| 5,063,709 | 11/1991 | Whittaker | 47/46 R |
| 5,337,514 | 8/1994 | Hiyama et al. | 47/46 R |

*Primary Examiner*—Terry Lee Melius
*Assistant Examiner*—Joanne C. Downs
*Attorney, Agent, or Firm*—Worrel & Worrel

[57] ABSTRACT

A support apparatus having a first mounting element adapted to be mounted on a support, a second mounting element having a structure for receiving at least one work object thereon, and an assembly for interconnecting the first mounting element and the second mounting element to support the structure of the second mounting element in a predetermined attitude relative to the support.

12 Claims, 3 Drawing Sheets

SUPPORT APPARATUS

BACKGROUND OF THE INVENTION

1. Field of the Invention

The present invention relates to a support apparatus and, more particularly, to such a support apparatus which achieves a heretofore unattained combination of dependability, durability and low cost and which has application to a wide variety of operative environments with particular utility in trellis structures employed to support vine borne crops.

2. Description of the Prior Art

A variety of environments require the use of support apparatuses of various types adapted to control the arrangement and configuration of work objects for various operative purposes. For example, in the training and growth of commercial crops of various types, it is frequently necessary to employ a variety of types of support structures to retain the plant growth in particular configurations, or confined within predetermined areas, for purposes of practical commercial utility. These problems are particularly acute in the case of plant life, such as grapevines, wherein the otherwise largely random and uncontrolled growth of the individual grapevines requires careful segregation of certain portions thereof throughout the growing season in order to produce a commercially viable crop which can be harvested at an acceptable cost. Were it not for such horticultural practices, the crop produced by the grapevines would be inextricably intermingled with the foliage and canes of the grapevines precluding adequate growth, coloration and sugar content in the fruit and otherwise interfering with harvesting. As a consequence of the foregoing plant growth characteristics, a multiplicity of support structures have been employed from antiquity to segregate portions of the grapevines during predetermined periods of the growing season. For example, the simple grape arbor has been in usage for perhaps thousands of years for this purpose.

Modern horticultural practice in the case of grapevines calls for the use of trellis structures on which the grapevines are trained in rows. A plethora of different types of trellis structures have been developed in an effort to achieve the most effective cultural control of the grapevines suitable for large scale farming operations. For example, the Burton U.S. Pat. No. 3,419,998 discloses such a trellis system in which the objective is to segregate canes, foliage and crops into substantially discreet zones of growth. Conventional trellis systems have, to varying degrees, been successful in achieving certain of their objectives. However, they are otherwise susceptible to a variety of chronic deficiencies.

One such deficiency resides in the fact that the installation and maintenance of such large scale trellis structures is expensive. Typically, such prior art trellis structures require the stringing of trellis wires along parallel courses longitudinally of each row of grapevines. The trellis wires are retained in the intended positions by support structures which are mounted in upright, spaced relation in the row. The trellis wires are tensioned and must be secured on cross members of the support structures, which are typically fabricated of wood, or in some instances metal. Typically, the trellis wires are held in position by staples, or other such securing means. The installation and maintenance of such structures is expensive due to the necessity for using relatively skilled labor in the process. There is a continual need to adjust tile elements during assembly relative to several axes of reference. Upright posts must typically be adjusted relative to true vertical in two planes of reference. Cross members must be adjusted relative to true horizontal. The trellis wires must extend along individual courses parallel to the longitudinal axis of the row. The spacing of the trellis wires must be in accordance with the particular design scheme employed. The trellis wires must preferably define a plane in accordance with the same design scheme. Any number of other design criteria may need to be followed. These same parameters apply in both installation as well as maintenance thereby requiring the use of semiskilled workers under close supervision.

When subjected to the rigors of the environment through one or more growing seasons, the trellis structures readily fall into disrepair. The staples deteriorate, loosen, or the trellis wires are otherwise released from their supports. The trellis wires become displaced from their intended locations. The support structures are typically displaced from their intended attitudes by the forces of nature, or by uneven tension due to release of the trellis wires, or simply due to deterioration. Other factors contributing to the dilapidation of such trellis structures include the uncontrolled growth of the grapevines themselves; the natural deterioration of the trellis structure due to dehydration of the wood portions thereof and oxidation of the metal portions; damage during the application of normal horticultural practices such as pruning, harvesting, spraying, irrigation and the like; and a myriad of other causative factors. The result is that maintenance is continually required.

Another deficiency typically experienced with prior art trellis structures results from the characteristic of the structures to be rather elaborate in design, making them particularly expensive and susceptible to damage. While the principal objective of such elaborate structures is more surely to achieve segregation of the portions of the grapevines heretofore discussed, the practical result is trellis structures which are ill suited over long operational lives to practical commercial utility.

Therefore, it has long been known that it would be desirable to have a support apparatus which has application to a wide variety of operative environments; which is particularly well suited to the raising of vine borne crops, such as grapevines, on a large commercial scale; which achieves an optimum combination of attributes having particular importance in large farming operations; which can be installed and maintained at minimum expense and yet which is of a strength and durability not heretofore achieved in the art; which can be installed and maintained with minimal instruction, but nonetheless with a precision not heretofore possible; and which is otherwise entirely successful in achieving its operational objectives.

SUMMARY OF THE INVENTION

Therefore, it is an object of the present invention to provide an improved support apparatus.

Another object is to provide such a support apparatus which is adaptable for use in a multiplicity of operative environments.

Another object is to provide such a support apparatus which has particular utility in the commercial farming of vine borne crops, such as grapevines, being adaptable to virtually all varieties thereof.

Another object is to provide such a support apparatus which achieves commercially desirable objectives not heretofore achieved in the art in that it is of lower cost to install and maintain than prior art devices while being stronger and more dependable over a longer operational life than has previously been achieved in the art.

3

Another object is to provide such a support apparatus which can be installed and maintained by personnel having minimal instruction while ensuring that such installation and maintenance can be achieved with a precision without precedent in the art.

Another object is to provide such a support apparatus which is composed of structural components which are assembled in such a fashion so as to interlock during installation with a precision fully conforming to design tolerances and which, similarly, can be repaired and maintained by disengagement of the interlocking portions thereof for replacement of worn or broken component parts fully restoring the support apparatus to the design tolerances desired.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention, a support apparatus having a first mounting element adapted to be mounted on a support, a second mounting element having means for receiving at least one work object thereon, and a fixture for interconnecting the first mounting element and the second mounting element to support the receiving means of the second mounting element in a predetermined attitude relative to the support.

DESCRIPTION OF THE PREFERRED EMBODIMENT

Figure 1:
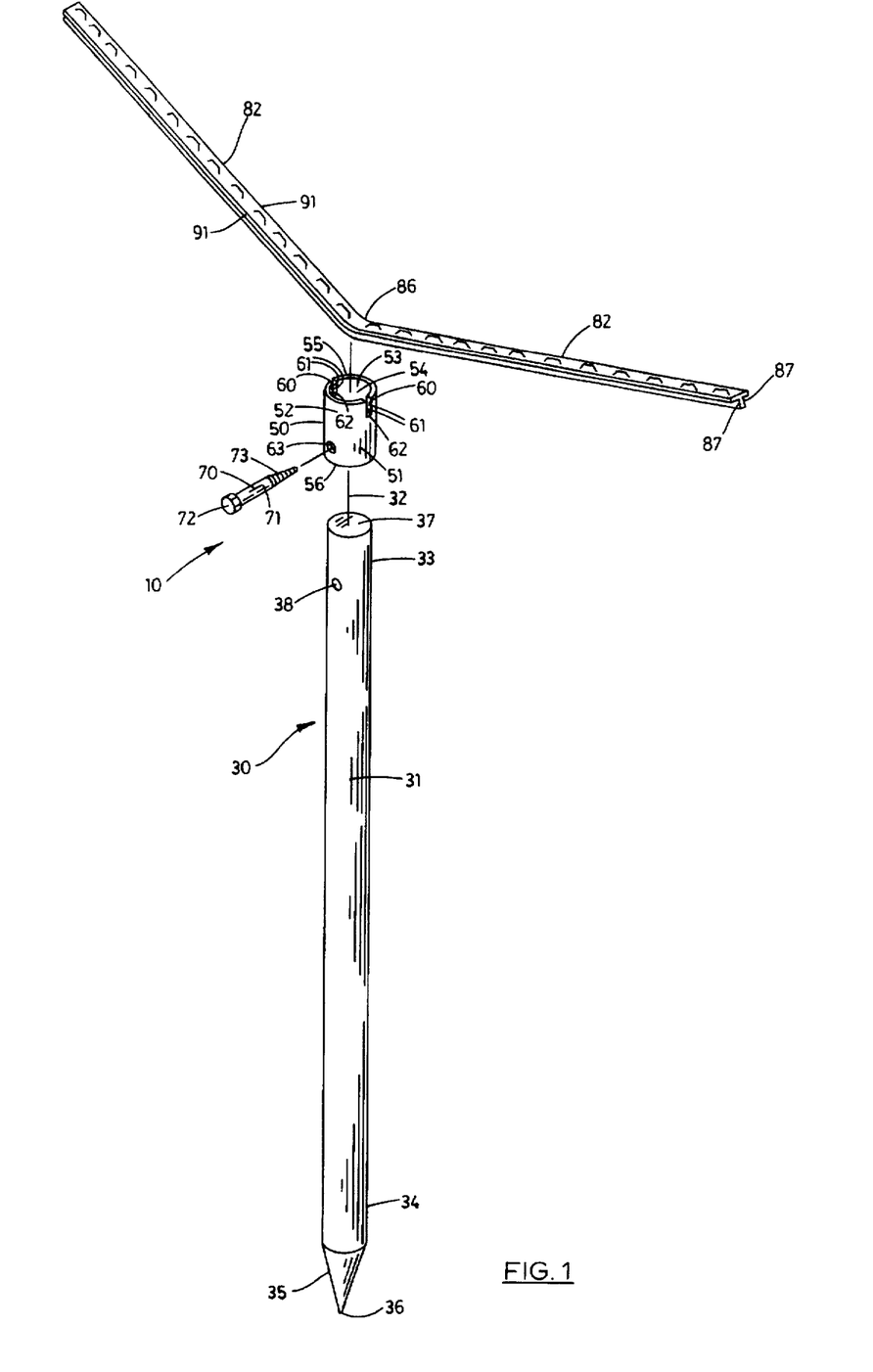
FIG. 1 is an exploded perspective view of the support apparatus of the present invention.

Referring more particularly to the drawings, the support apparatus of the present invention is generally indicated by the numeral 10 in FIG. 1. While the support apparatus of the present invention is adaptable for use in a wide variety of operative environments, it is particularly well suited to large scale commercial farming operations where the commercial crops are grown in rows and require segregation of certain portions thereof in the training, management and harvesting of the crops during the growing seasons. One such operative environment is in management, harvesting and other crop husbandry practices required in the commercial farming of grapevines. The commercial crops produced by such grapevines include table grapes, wine grapes, currants, raisins, and the like. The support apparatus of the present invention is particularly well suited to such farming of grapevines and, therefore, will be described in this operative environment. It will be understood, however, that the invention is not limited thereto.

Figure 2:
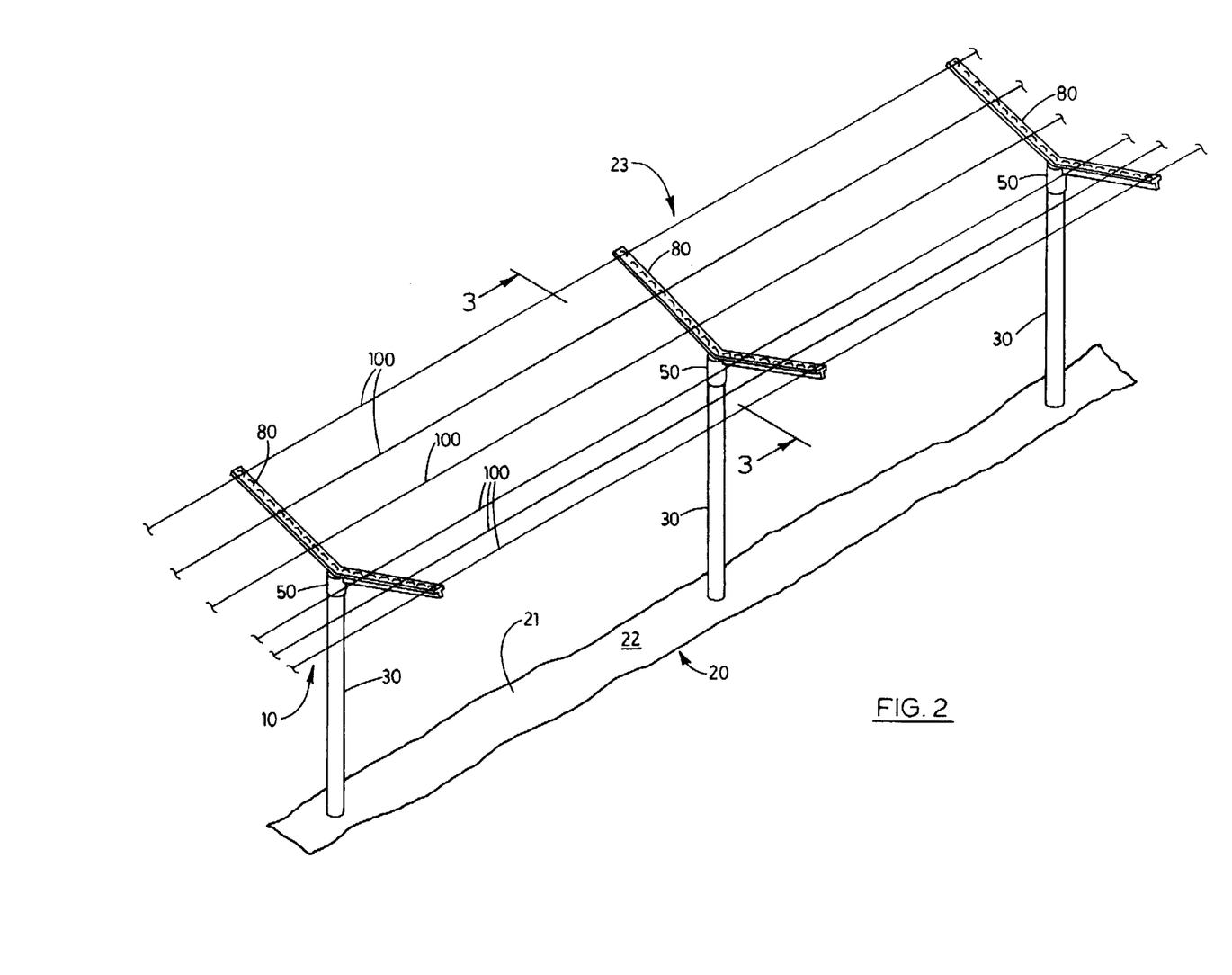
FIG. 2 is a somewhat reduced, fragmentary perspective view of three of the support apparatuses of FIG. 1 arranged in a typical operative environment to forming a trellis structure such as used to support grapevines grown in a row.

The support apparatus 10 is thus shown in FIG. 2 in a vineyard 20. The earth, or berm, 21 within which the grapevines are grown has a surface 22. Thus, a crop row is generally indicated at 23. For illustrative convenience, the grapevines grown in the row are not shown so as to leave fully visible the support apparatus of the present invention as arranged in multiples in this particular operative environment.

4

The support apparatus 10 includes a stake, or post, 30 best shown in FIG. 1. The post may be constructed in any suitable material such as metal, wood, plastic or the like. However, in the described embodiment, the post is preferably fabricated from a hard wood such as Douglas Fir, While Fir, pine, or hemlock. The post, in the preferred embodiment, has an outer cylindrical surface 31 which defines a longitudinal axis 32. The post has an tipper end portion 33 and an opposite lower end portion 34. The lower end portion has a conical or tapered portion 35 extending axially therefrom to an apex 36. The upper end portion 33 of the post has a flat upper surface 37 defining a plane preferably, although not necessarily, right-angularly related to the longitudinal axis 32. In the preferred embodiment, a screw or bolt hole 38 is extended from the outer cylindrical surface 31 of the post to the upper end portion 33 in predetermined spaced relation to the flat upper surface 37. The bolt hole is preferably extended along a path adapted to intersect the longitudinal axis 32 of the post.

The support apparatus includes a fixture generally indicated by the numeral 50. The fixture is preferably constructed of any suitable metal and has a tubular cylindrical side wall 51. The side wall has a cylindrical exterior surface 52 and a cylindrical interior surface 53. The interior surface 53 defines a cylindrical passage 54 dimensioned slidably to be interfitted about the tipper end portion 33 of the post 30, as hereinafter described. The tubular side wall 51 has an annular tipper edge 55 and an opposite annular lower edge 56.

The side wall 51 of the fixture has a pair of slots 60 extending inwardly of the side wall from the upper edge 55 thereof along courses one hundred eighty degrees (180°) apart about the annular upper edge. The slots define a plane which is coextensive with the longitudinal axis defined by the cylindrical passage 54 of the fixture, as may best be seen in FIG. 1. Each slot is defined by a pair of parallel edges, or surfaces, 61 leading to a terminal surface 62 which is preferably right-angularly related to and extends between the parallel surfaces 61. The distance between the upper edge 55 of the tubular side wall 51 and the terminal surface 62 is preferably a predetermined distance hereinafter to be described. A screw or bolt hole 63 extends through the tubular side wall in a predetermined position also hereinafter to be defined.

The support apparatus 10 includes a screw or bolt 70 having a shaft 71 mounting a hexagonal head 72 at one end thereof and having tapered screw threads 73 extending to the other end thereof. The bolt is preferably of a predetermined diameter in length, as will hereinafter be described.

Figure 3:
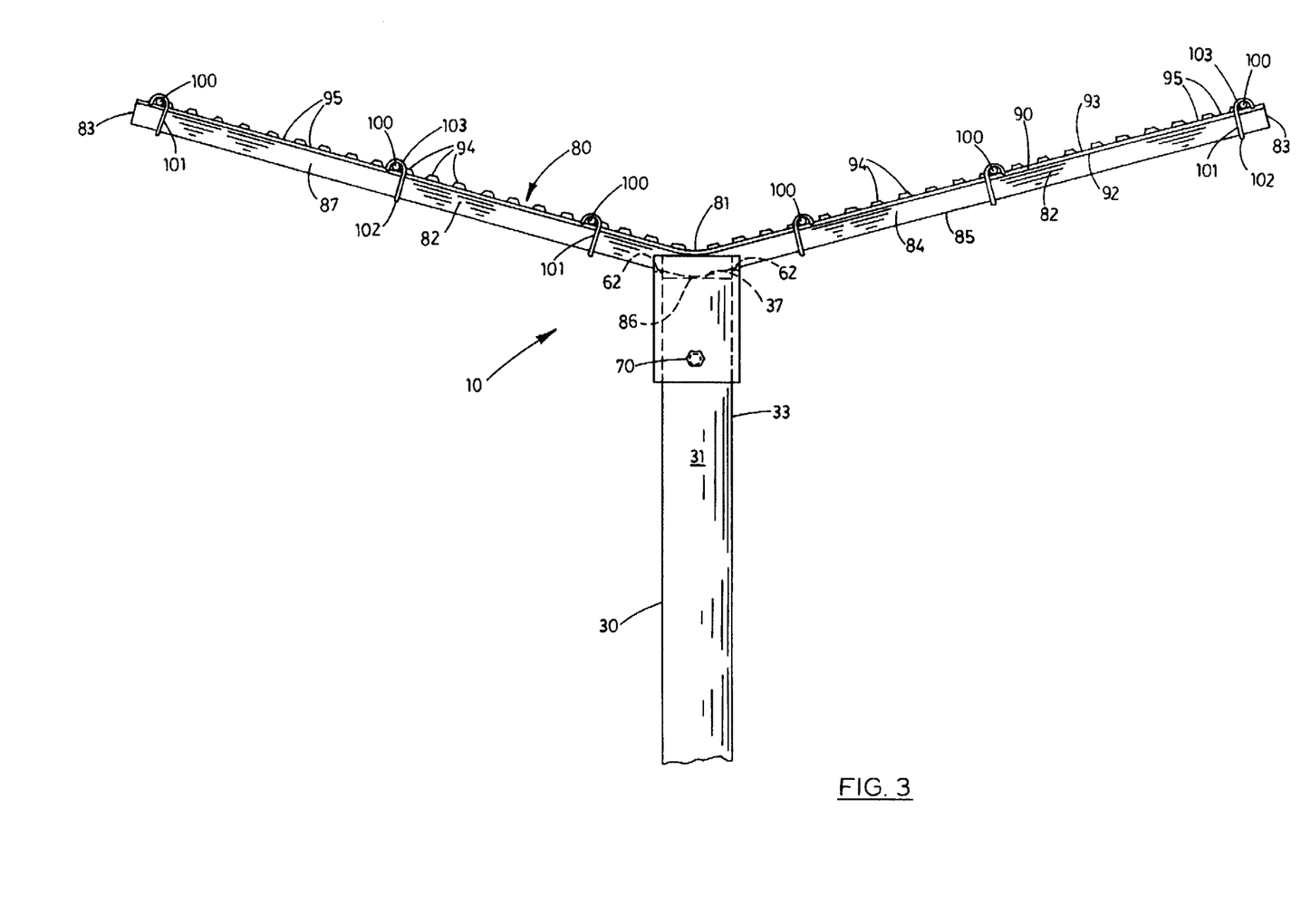
FIG. 3 is a somewhat enlarged, fragmentary front elevation of the support apparatus of FIGS. 1 and 2 taken on line 3—3 in FIG. 2.

The support apparatus 10 has a cross member, or arm, generally indicated by the numeral 80 and, perhaps, best shown in FIG. 3. The arm has a central bent portion generally indicated at 81 and oppositely extending lateral portions generally indicated at 82. The lateral portions 82 extend to terminal end portions 83.

The cross arm 80 is, in the preferred embodiment, made from a studded T-post such as are commonly used in metal fencing. Such studded T-posts are in plentiful supply and available at nominal cost and can be cut to any desired length. The cross arm, thus, has a web or vertical, downwardly extending flange 84 extending to a terminal edge 85. The cross arm is bent so that the terminal edge extends to a central apex 86. The flange 84 has substantially parallel side surfaces 87. Similarly, the cross arm 80 in the form of tile studded T-post has a transverse flange 90 integral with the flange 84 and right-angularly related thereto. The transverse flange has parallel lateral edges 91, a lower surface 92 and a parallel opposite upper surface 93. In cross section, the upper and lower surfaces 92 and 93 of the transverse flange are right-angularly related to the side surfaces 87 of the downwardly extending flange 84.

The cross arm 80 in tile form of the studded T-post has a plurality of protrusions, or studs, 94 mounted on and extending upwardly from the upper surface 93 of the transverse flange 90, as best shown in FIG. 3. The studs are aligned in a row extending parallel to the lateral edges 91 of the transverse flange and midway therebetween. Adjacent studs 94 in the row are separated from each other equal distances to form an interstice 95 therebetween.

The support apparatus 10 is assembled, as can best be visualized in FIGS. 1 and 3. The order of such assembly may be as preferred. Such order of assembly may be dependent upon the particular requirements of the specific operative environment. In any case, the tapered portion 35 of the post 30 is driven into the berm 21 along a course defining the row 23 in upstanding relation so that the longitudinal axis 32 is preferably in a true vertical position. The flat upper surface 37 of the post can be used for purposes of driving the post into the earth using a hammer or other suitable implement. Alternatively, where desired, the lower end portion 34 of the post can be mounted in concrete in the earth in the attitude described.

The fixture 50 is then slip fitted about the tipper end portion 33 of the post 30. This is achieved by tile fixture being forced downwardly so that the upper end portion of the post is slidably received in the cylindrical passage 54 of the fixture. The fixture is moved along a course with the bolt hole 63 thereof aligned, as shown in FIG. 1, with the bolt hole 38 of the post. The fixture is moved downwardly thereon until the bolt hole and screw hole are aligned in coincidence so as to define an axis right-angularly related to the longitudinal axis 32 of the post. The bolt 70 is then extended through the bolt hole 63 of the fixture and screw threaded into the bolt hole 38 of the tipper end portion of the post until the head 72 of the bolt engages the exterior surface 52 of the fixture. The bolt is tightened inwardly so as firmly to section the fixture in the position described.

Referring more particularly to FIG. 3, when the fixture 50 is secured in this position the plane defined by the slot 60 previously described is thereby automatically precisely aligned with the longitudinal axis 32 of the post and right-angularly related to the axis defined by the bolt 70. This ensures that the plane defined by the slots is precisely vertical and right-angularly related to the course defined by the row 23, as may best be visualized in FIG. 2. The cross arm 80 is then positioned, as shown in FIG. 3, with the flange 84 slidably received in the slots 60. Thus, it will be seen that each of the slots 60, or, in other words the distance between the parallel surface of 61 thereof is a distance permitting snug, slidable receipt of the flange 84 therewithin.

The apex 86 of the terminal edge 85 of the flange is preferably positioned in coincidence with the longitudinal axis 32 of the post, as shown in FIG. 3. The cross arm 80 is adjusted about an axis right-angularly related to the longitudinal axis 32 of the post by slidable adjustment within the slots so as preferably to position the apex 86 precisely in coincidence with the longitudinal axis of the post and the terminal end portions 83 of the cross arm so as to define an axis of reference extending therebetween which is horizontal and thus right-angularly related to the longitudinal axis of the post. Once so positioned, the cross arm is preferably permanently affixed to the fixture 50, by welding, so as to form a suitable weldment, or weldment, interconnecting the fixture and the cross arm. Alternatively, screws, bolts, clips, or the like can be employed for interlocking each cross arm with its respective fixture.

In the illustrative embodiment described herein, a plurality of trellis wires 100 are extended along corresponding interstices of the plurality of support apparatuses 10 defining the row 23, as shown in FIG. 2. Depending upon the variety of grapevine, the horticultural practice preferred and other considerations, any number of trellis wires can be employed and can be spaced as desired within their individual corresponding interstices. As best visualized in FIG. 3, virtually an infinite number of such trellis wires can be employed in this fashion. A plurality of wire clips 101, having a lower return bent portion 102 and a pair of upper hook portions 103 are individually clipped about the cross arm with the return bent portion extending under the flange 84 and the hook portions 103 extending about the trellis wire on opposite sides of the parallel lateral edges 91 of the transverse flange 90 so as to retain its respective trellis wire in the interstice 95 between adjoining studs 94.

OPERATION

The operation of the described embodiment of the subject invention is believed to be clearly apparent and is briefly summarized at this point.

When a plurality of the support apparatuses 10 are mounted in the manner described extending upwardly from the berm 21 within each row 23, the trellis wires 100 are available to support the pendent portions, or canes, and foliage and crop of grapevines, not shown, grown in the row. The particular variety of grapevine, spacing in the row and the like are not part of the present invention and therefore are not described. Any arrangement of grapevines can be employed and trained in accordance with the horticultural practices desired. However, it will be apparent that the strength of the cross arms constructed of the studded T-posts heretofore described, is substantially greater than has heretofore been possible. The particular angle to which the cross arm is bent at the bent portion 81 is dependent entirely upon the particular horticultural practice preferred. The number of trellis wires 100 employed in the row using the support apparatuses of the present invention is purely dependent upon the particular horticultural practices preferred.

Furthermore, the number of trellis wires 100 employed can be changed, if desired, over time. Removal of existing trellis wires is achieved simply by removing the wire clips 101. The addition of trellis wires is achieved by tensioning the new trellis wires in predetermined interstices 95 of the support apparatuses in accordance with the preferences involved. This can, if desired, or necessary, be performed in a single growing season either to replace broken trellis wires or to modify the particular horticultural practice. This is purely within the control of the operator. Such readjustment, or maintenance, in no way compromises the integrity of the support apparatuses 10 forming the row in view of the superior strength achieved thereby.

In addition, the minimal cost of the components comprising each support apparatus ensure that while the support apparatuses forming the row are of superior strength, they are also of substantially less cost, including initial purchase price, installation and maintenance, than as heretofore been achievable.

Still further, because of the unique inter-relationship of the longitudinal axis 32 of the post 30, the position of the screw hole 38 and bolt hole 63 and the relationship thereto of the slots 60 together with the flange 84, apex 86 and method for installation heretofore described, the installation and maintenance of the support apparatuses in precise conformance to the design tolerances is not only virtually automatically achieved, but can be performed by manual labor with only minimal supervision. The precision of the resulting installation relative to the various axes and planes of reference achieves a precision not heretofore achieved in the art.

Therefore, the support apparatus of the present invention has application to a wide variety of operative environments; is particularly well suited to the raising of vine borne crops, such as grapevines, on a large commercial scale; achieves the optimum combination of attributes having particular importance in large farming operations; can be installed at minimal expense and yet is of a strength and durability not heretofore achieved in the art; can be installed and maintained with minimal instructions, but nonetheless with a precision not heretofore possible; and is otherwise entirely successes in achieving its operational objectives, including requiring a minimal expense for installation and maintenance while being of a strength and durability not heretofore achieved in the art; and which can be installed with minimal instruction with a precision not heretofore possible.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A support apparatus comprising a first mounting element adapted to be mounted on a means of support; a second mounting element having means for receiving at least one work object thereon; and means for interconnecting said first mounting element and said second mounting element to support said receiving means of the second mounting element in a predetermined attitude relative to said means of support, in which said interconnecting means includes a slot provided in one of said first mounting element or second mounting element and a flange provided in the other of said first mounting element or second mounting element, said slot and flange dimensioned to be interfitted to support the second mounting element in said predetermined attitude, and wherein said first mounting element has a pair of said slots which are aligned with each other to define a plane of reference substantially defining a first axis of orientation of said predetermined attitude, said slots terminate at corresponding terminal ends which are aligned substantially to define a second axis of orientation of said predetermined attitude, and the second mounting element mounts said flange which is dimensioned slidably to be received in said slots for retention in said predetermined attitude substantially defined by said first and second axes of reference.

2. The support apparatus of claim 1 wherein said means of support has an end portion defining a longitudinal axis, said first mounting element has a tubular end portion, spaced from said slots thereof, dimensioned slidably to be received on the end portion of said means of support in mating relation so as to define a third axis of orientation of said predetermined attitude relative to said means of support.

3. The support apparatus of claim 2 including a fastener adapted releasably to interconnect said tubular end portion of the first mounting element and the end portion of said means of support in substantially fixed position relative to said third axis of orientation.

4. The support apparatus of claim 1 wherein said receiving means of the second mounting element has a support surface mounting a plurality of protrusions thereon aligned in adjacent spaced relation to each other to define a plurality of interstices therebetween dimensioned individually to receive one of said work objects therein so that adjacent work objects are retained in laterally spaced relation to each other.

5. The support apparatus of claim 4 including a plurality of clips individually, releasably adapted to be extended about the second mounting element and over one of said work objects to retain said one of said work objects within its respective interstice thereof.

6. A support apparatus for bearing plant life, such as grapevines and the like, in upstanding relation, the apparatus comprising:

A. a cross arm composed of a metal member having a substantially continuous transverse configuration, including a flange portion substantially defining a first plane of reference and a plate portion substantially defining a second plane of reference substantially right-angularly related to the first plane of reference and integral therewith, and said metal member being bent substantially centrally thereof to define a pair of arm portions extending in substantially opposite directions from an apex whereby the second plane of reference defines a substantially obtuse angle;

B. a support post elongated along and defining a longitudinal axis and having a lower end portion adapted to be disposed in the earth in upstanding relation and an opposite upper end portion having a predetermined transverse configuration;

C. a coupling including a metal sleeve having a lower end portion having an internal passage with a predetermined transverse configuration adapted slidably to be interfitted with said upper end portion of the support post and an opposite upper end portion having a pair of slots disposed in spaced relation to each other and aligned substantially to define a third plane of reference, said slots transversely dimensioned slidably to receive said flange portion of the metal member; and D. means for interlocking, in an assembled condition, the lower end portion of the metal sleeve with the upper end portion of the support post and the flange portion of the metal member in said slots with the apex of the metal member between said slots thereby forming a support apparatus having substantially a Y configuration for bearing said plant life.

7. The support apparatus of claim 6 wherein, in said assembled condition, the third plane of reference defined by the slots is substantially coextensive with the longitudinal axis of the support post and the apex of the metal member is substantially coincident with said longitudinal axis.

8. The support apparatus of claim 7 wherein said arm portions of the metal member individually extend to terminal end portions and the plate portion thereof has a plurality of studs extending therefrom on the side thereof opposite to the flange portion and arranged in a pattern extending between said terminal end portions along a substantially linear course individually spaced from each other to define interstices between adjacent studs.

9. The support apparatus of claim 8 including a plurality of trellis wires individually extended along substantially parallel courses substantially right-angularly related to said third plane of reference and individually received in selected interstices to define a trellis for bearing said plant life.

10. The support apparatus of claim 9 including a plurality of wire clips individually extending about the arm portions and individually having tensioned hook portions extending about and thereby capturing the trellis wires in their respective interstices.

11. The support apparatus of claim 10 wherein said interlocking means includes a fastener extending through the lower end portion of the metal sleeve and into the upper end portion of the support post and a weldment interconnecting the upper end portion of the metal sleeve and said metal member.

12. The support apparatus of claim 11 wherein the support post is a substantially cylindrical wood post wherein said upper end portion thereof has a substantially flat end surface substantially right-angularly related to said longitudinal axis of the support post and in said assembled condition the apex of the metal member is rested on said flat end surface with the flange portion thereof extending in opposite directions through the slots of the metal sleeve.

* * * * *

UNITED STATES PATENT AND TRADEMARK OFFICE
CERTIFICATE OF CORRECTION

PATENT NO. : 5,630,292

DATED : May 20, 1997

INVENTOR(S) : David D. Heinz; Frank A. Logoluso

Page 1 of 2

It is certified that error appears in the above-identified patent and that said Letters Patent is hereby corrected as shown below:

Column 1, Line 66, delete "tile" and substitute -- the --

Column 2, Line 7, delete "tile" and substitute -- the --

Column 4, Line 8, delete "tipper" and substitute -- upper --

Column 4, Line 26, delete "tipper" and substitute -- upper --

Column 4, Line 28, delete "tipper" and substitute -- upper --

Column 4, Line 65, delete "tile" and substitute -- the --

Column 5, Line 6, delete "tile" and substitute -- the --

Column 5, Line 28, delete "tipper" and substitute ---upper --

Column 5, Line 29, delete "tile" and substitute -- the --

Column 5, Line 39, delete "tipper" and substitute -- upper --

Column 5, Line 42, delete "section" and substitute -- secure --

Column 6, Line 2, after "or" delete "weldment" and substitute -- weldments ---.

UNITED STATES PATENT AND TRADEMARK OFFICE
CERTIFICATE OF CORRECTION

PATENT NO. : 5,630,292
DATED : May 20, 1997
INVENTOR(S) : David D. Heinz, et. al.

It is certified that error appears in the above-indentified patent and that said Letters Patent is hereby corrected as shown below:

Column 7, Line 43, delete "dement" and substitute ---element--

Signed and Sealed this

Twenty-ninth Day of July, 1997

Attest:

BRUCE LEHMAN

Attesting Officer

Commissioner of Patents and Trademarks